United States Patent
Ibarra

(10) Patent No.: US 10,680,899 B1
(45) Date of Patent: Jun. 9, 2020

(54) TOPOLOGY DISCOVERY THROUGH MULTICAST TRANSMISSION

(71) Applicant: SYNAPSE WIRELESS, INC., Huntsville, AL (US)

(72) Inventor: Eric Joseph Ibarra, Madison, AL (US)

(73) Assignee: SYNAPSE WIRELESS, Inc., Huntsville, AL (US)

( * ) Notice: Subject to any disclaimer, the term of this patent is extended or adjusted under 35 U.S.C. 154(b) by 128 days.

(21) Appl. No.: 16/022,220

(22) Filed: Jun. 28, 2018

(51) Int. Cl.
   *H04L 12/24* (2006.01)
   *H04W 88/16* (2009.01)
   *H04L 12/931* (2013.01)
   *H04L 12/751* (2013.01)

(52) U.S. Cl.
   CPC .............. *H04L 41/12* (2013.01); *H04L 45/02* (2013.01); *H04L 49/201* (2013.01); *H04W 88/16* (2013.01)

(58) Field of Classification Search
   CPC ......... H04L 41/12; H04L 45/02; H04W 88/16
   See application file for complete search history.

(56) References Cited

U.S. PATENT DOCUMENTS

| | | | | |
|---|---|---|---|---|
| 7,342,896 B2* | 3/2008 | Ayyagari | ................ | H04L 45/02 370/254 |
| 7,401,152 B2* | 7/2008 | Traversat | .............. | G06F 9/4416 370/254 |
| 7,403,492 B2* | 7/2008 | Zeng | ..................... | H04L 12/189 370/254 |
| 7,443,833 B2 | 10/2008 | Ayyagari | | |
| 7,720,471 B2* | 5/2010 | Ayyagari | ................ | H04L 41/00 370/224 |
| 8,432,808 B1* | 4/2013 | Dankberg | ............. | H04L 67/325 370/235 |
| 9,226,220 B2 | 12/2015 | Banks et al. | | |
| 10,284,381 B1* | 5/2019 | Weiner | .................... | H04L 45/02 |
| 2002/0044533 A1* | 4/2002 | Bahl | ..................... | H04W 8/005 370/255 |
| 2003/0177263 A1* | 9/2003 | Robinson | ................ | H04L 45/00 709/239 |
| 2004/0218548 A1* | 11/2004 | Kennedy | ............... | H04L 1/1685 370/254 |
| 2005/0174950 A1* | 8/2005 | Ayyagari | ................ | H04L 41/12 370/254 |

(Continued)

*Primary Examiner* — Parth Patel
(74) *Attorney, Agent, or Firm* — Maynard Cooper & Gale, P.C.; Jon E. Holland

(57) ABSTRACT

A wireless network can perform a topological mapping through its gateway, which sends a multicast message over the wireless network to every node of a network. Each of the nodes on the network, on receipt of the multicast message, can transmit a one-hop multicast message containing a topological ping to its neighboring nodes. A neighboring node receiving a topological ping will store information relating to the link quality between the sender and neighboring nodes. After network traffic related to the topology discovery has quieted, the neighboring nodes sends the stored information to the gateway, without any processing by the node which sent the topological ping. All nodes may also implement a randomized delay both before sending the topological ping, and/or before sending the stored information to the gateway, to minimize the opportunity for data collision of messages relating to topological discovery.

13 Claims, 5 Drawing Sheets

(56) References Cited

U.S. PATENT DOCUMENTS

| | | | |
|---|---|---|---|
| 2006/0029007 A1* | 2/2006 | Ayyagari | H04L 45/02 370/310 |
| 2008/0219237 A1* | 9/2008 | Thubert | H04L 45/16 370/349 |
| 2008/0291847 A1* | 11/2008 | Zheng | H04L 45/26 370/255 |
| 2009/0180400 A1* | 7/2009 | Chiabaut | H04L 12/462 370/255 |
| 2010/0074146 A1* | 3/2010 | Banks | H04L 1/1867 370/254 |
| 2010/0177665 A1 | 7/2010 | Ayyagari | |
| 2011/0080908 A1* | 4/2011 | Ko | H04L 12/185 370/390 |
| 2011/0096710 A1* | 4/2011 | Liu | H04L 1/1614 370/312 |
| 2011/0134797 A1* | 6/2011 | Banks | H04W 40/246 370/254 |
| 2011/0164527 A1* | 7/2011 | Mishra | H04L 45/123 370/252 |
| 2014/0075085 A1* | 3/2014 | Schroder | G06F 13/4022 710/317 |
| 2015/0229422 A1* | 8/2015 | Guagenti | H04J 14/08 398/35 |
| 2017/0317952 A1* | 11/2017 | Sillankorva | H04L 25/05 |
| 2019/0075469 A1* | 3/2019 | Mahoney | H04W 16/12 |
| 2019/0229937 A1* | 7/2019 | Nagarajan | H04L 12/18 |

\* cited by examiner

N2 Link Status Table

| Transmitting Node (40) | Receiving Node (42) | Link Quality (RSSI) (44) |
| --- | --- | --- |
| N3 | N2 | -40 dBm |
| N1 | N2 | -50 dBm |

FIG. 4A

N3 Link Status Table

| Transmitting Node (40) | Receiving Node (42) | Link Quality (RSSI) (44) |
| --- | --- | --- |
| N2 | N3 | -40 dBm |
| N4 | N3 | -65 dBm |
| N5 | N3 | -65 dBm |

FIG. 4B

N4 Link Status Table

| Transmitting Node (40) | Receiving Node (42) | Link Quality (RSSI) (44) |
| --- | --- | --- |
| N3 | N4 | -65 dBm |
| N5 | N4 | -65 dBm |

FIG. 4C

TOPOLOGY DISCOVERY THROUGH MULTICAST TRANSMISSION

RELATED ART

As the number of devices on a wireless network increases, there is a corresponding increase in network traffic and thus data collisions. In some cases, transmission between network nodes is managed via the maintenance of routing tables that indicate designated routes for messages. Nodes can communicate among one another to learn of data paths for various destinations. However, traditional methods of communicating between nodes for route discovery result in a large number of messages being exchanged. Because of this, there is a high transaction cost to route discovery, namely, an increase in overall network congestion.

It is desirable for a node, such as a gateway node that is managing a network or subnetwork of nodes, to be aware of a topology of the network or subnetwork to facilitate various management functions, such as firmware updates. A node, referred to herein as a "topology-building node," may initiate a topology discovery process in which the topology-building node communicates with other nodes to learn the topology of a network. Such topology discovery process adds to network traffic and increases congestion.

U.S. Pat. No. 9,226,220 describes a method of discovering the topology of a wireless network in which a topology-building node commands nodes one-by-one to broadcast a one-hop multicast message. Each node receiving such multicast message replies to the topology-building node, which builds a topology of the network based on the replies. However, this solution for building a topology results in a high amount of overall network traffic. Where there is a great deal of traffic on a wireless network, the probability of data collision increases.

Data collisions during a topology discovery process can be particularly problematic since they can prevent successful discovery of at least some nodes or links on the network resulting in an incomplete topological map. In some networks, the nodes are configured to transition to a mode where data communication is stopped or otherwise delayed during a topology discovery process in order to reduce data collisions and their impact to the discovery process. Shortening the duration of the discovery process can be particularly important when data communication is stopped or delayed.

Further techniques for improving the efficiency and accuracy of topology discovery processes are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIGS. 4A-4C are illustrations of exemplary tables maintained in the memory of the network nodes depicted in FIG. 3.

DETAILED DESCRIPTION

The present disclosure generally pertains to systems and methods for discovering topologies of wireless networks. For example, the disclosure is directed to an improved implementation of topological discovery that seeks to reduce the total number of messages sent between nodes without significantly degrading the robustness and accuracy of the discovery process. By reducing the number of messages required, the discovery process can be shortened and the number of data collisions within the discovery process can be reduced.

In one exemplary embodiment, a gateway device ("gateway") transmits a multicast message over a wireless mesh network such that each of a plurality of nodes in the network to be mapped receives the message. The message sent by the gateway causes each of the nodes (hereafter, "transmitting nodes") to reach out to its neighboring nodes, via a multicast message, referred to herein as a "topological ping," which is a request to generate topological information. Note that the topological ping may be a one-hop multicast message that is not retransmitted by the nodes that receive it. The neighboring nodes (hereafter, "receiving nodes") that receive the topological ping take note of information relating to the status of the link between the transmitting and receiving node. This information might include, for example, a network identifier of each transmitting node from which it receives a topological ping, and a link quality measurement for each such transmitting node, such as a received signal strength indicator value. A receiving node determines this information and stores it in an internal memory. If the receiving node is a neighbor to multiple nodes, it may receive multiple topological pings. The receiving node may then, for example, aggregate or compile information from those multiple links into a stored link status table. It may then wait for network traffic related to topology discovery to reduce or subside. Once the transmission of topological pings has grown relatively quiet across the network, each receiving node may then transmit the information in its link status table to the gateway. These transmissions from the receiving nodes may be staggered according to a random delay interval (or another method) to minimize data collision. Once all this information has been sent, the gateway, having received link status information from each receiving node, can build an accurate topological map.

Figure 1:
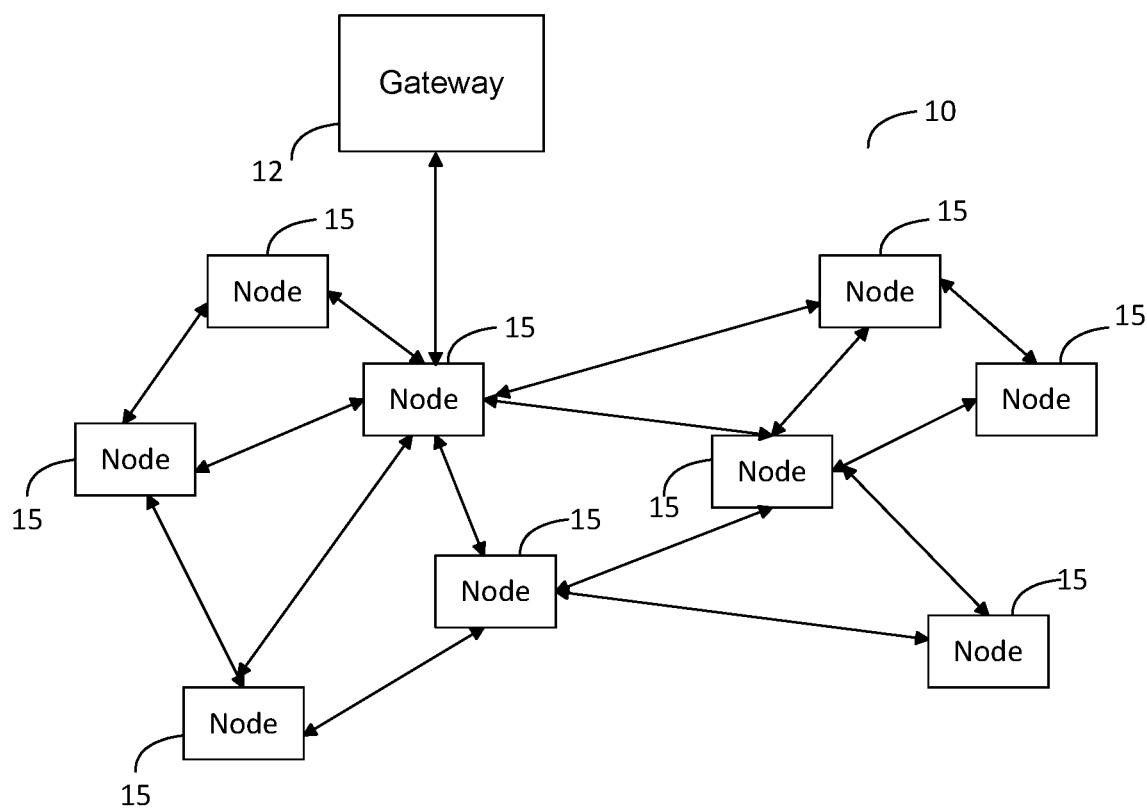
FIG. 1 is a block diagram illustrating an exemplary embodiment of a wireless network in accordance with the present disclosure.

FIG. 1 depicts a wireless network 10 of an exemplary embodiment of the present disclosure. As shown by FIG. 1, the network 10 has a plurality of nodes 15 that communicate with each other via wireless radio frequency (RF) signals according to a protocol defined for the network 10. The network 10 may have any number of nodes or may communicate in other frequency ranges. Each node 15 can be stationary (fixed in place) or can be mobile, such that it can be moved to a different physical location. In one exemplary embodiment, the nodes 15 communicate among one another wirelessly, but it is possible for any of the nodes 15 to communicate with any of the other nodes 15 over a conductive medium.

In an exemplary embodiment, the wireless nodes 15 may implement an ad hoc mesh network. Messages sent through the mesh network travel node-to-node until they reach their intended target destination. In practice, such an ad hoc network is topologically variable, as mobile nodes may move to a different location, additional nodes may be added, or nodes may become inaccessible. However, for illustrative purposes, with reference to FIG. 1, it can be assumed that any of the nodes 15 is only within wireless communication range of any of the nodes connected to it by an arrow, and can only communicate indirectly (through an intermediary) with a node not connected to it by an arrow. Because mesh networks generally have a plurality of paths to reach a given node, and because a network may topologically vary, a message sent between two nodes 15 can take different paths to reach its destination.

In general, there are at least two types of messages that can be communicated to nodes across the network 10, unicast messages and multicast messages. A unicast message refers to a message that is destined for a specific node, and travels along a path defined by routing tables within the nodes in order to reach its destination. In general, each hop along the route will respond to a unicast message with an acknowledgment, to ensure that the message is successfully communicated to its destination. By this mechanism, data transmittal between nodes becomes more reliable. However, the exchange of acknowledgments and route discovery messages necessary to find routes for through the network significantly increase network traffic and congestion.

Rather than unicast, the exemplary embodiment instead sends multicast messages, which are messages that may be sent to multiple nodes from a first transmitting node. A multicast message, unlike a unicast message, is a message that does not follow a single path defined by routing tables. The message is instead gradually retransmitted (also referred to as "rebroadcasting" or "forwarding") by nodes that receive the message regardless of its destination or destinations. Since a multicast message is typically retransmitted by each node that receives it, a node that receives a multicast message usually does not return an acknowledgment to the sender.

A multicast message includes a header and a payload portion, which includes the intended content data. Nodes 15 retransmit or broadcast the message through the network 10 based on the information in the message header. The header may include a time-to-live value, which is decremented every time the message is transmitted (a "hop") until it reaches zero or some set threshold, as which point the message is no longer retransmitted. Such practice eventually stops propagation of the multicast message so that it is not retransmitted in perpetuity. Alternatively, another manner of setting a finite time limit on the transmission period can be implemented. The header of the multicast message also typically contains a group identifier. Each node in a network may be provisioned so as to know which groups it is a member of. Upon processing a multicast message after receipt, a receiving node will be able to determine whether it is an intended group recipient.

Figure 2:
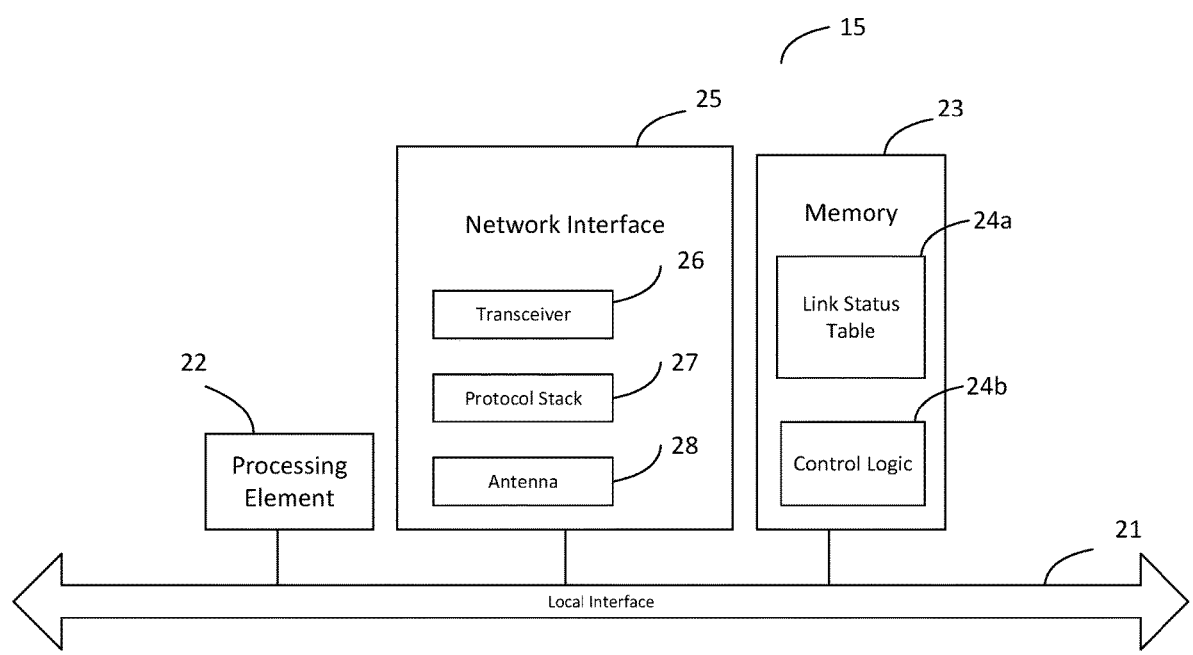
FIG. 2 is a block diagram illustrating an exemplary embodiment of a network node, such as is depicted by FIG. 1.

FIG. 2 depicts a node 15 in accordance with an exemplary embodiment of the present disclosure. The exemplary node 15 comprises at least one processing element 22, such as a central processing unit (CPU), digital signal processor, other specialized processor or combination of processors, or other circuitry that communicates to and drives the other elements within node 15 via a local interface 21 (for example, a bus). The node 15 has control logic 24b for generally controlling the operation of the node 15. The control logic 24b can be implemented in software, hardware, firmware, or any combination thereof. In the embodiment illustrated in FIG. 2, the control logic 24b is implemented in software and is stored in a memory 23. Various other data and code can also be written to or read from memory 23, including, for example, data related to topology discovery, such as one or more link status tables 24a to store information received from network nodes (described in more detail below). Control logic 24b, when implemented in software, can also be stored on any computer-readable medium, for example electronic, magnetic, or optical mediums, among others, or another system, apparatus, or device. The control logic 24b is implemented by a processing element 22, which comprises processing hardware (e.g., one or more processors) for executing instructions stored in the memory 23, or any other circuitry capable of executing the instructions of the control logic 24b.

The node 15 also has a network interface 25 for enabling communication with other nodes over the network 10. In an exemplary embodiment, the interface 25 is configured to communicate wirelessly over one or more geographic areas, but the interface 25 may alternately or additionally exchange data via a physical medium. As shown by FIG. 2, the network interface 25 has at least an antenna 28, a transceiver 26, and a protocol stack 27. The stack 27 controls the communication of data between the network interface 25 and the other networked nodes. In the exemplary node 15, the stack 27 is implemented in software, however, it may also be implemented in hardware, software, firmware, or any combination thereof. When implemented in software, the stack 27 may be stored in the node's memory 23 or other computer-readable medium.

In one exemplary embodiment, each component shown by FIG. 2 resides on and is integrated with a printed circuit board (PCB) (not shown). However, in other embodiments, other arrangements of the node 15 are possible.

Figure 3:
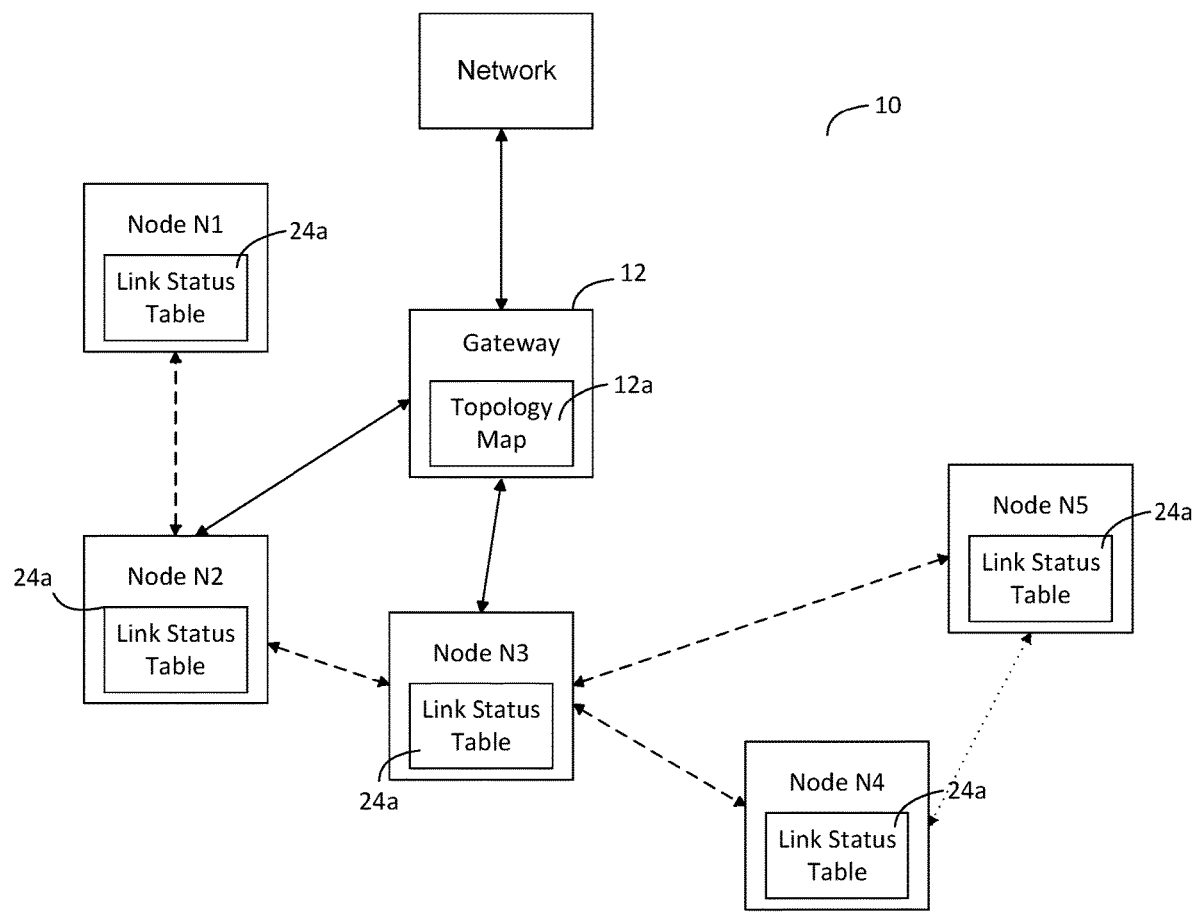
FIG. 3 is a block diagram illustrating an exemplary embodiment of a wireless network in accordance with the present disclosure.

An exemplary implementation of a topology discovery process in accordance with the present invention will now be discussed with reference to FIG. 3. FIG. 3 depicts an example embodiment of a wireless network 10 with a gateway 12 that manages a plurality of network nodes 25, labeled as node N1-node N5. For ease of discussion, the gateway is disclosed as managing a "network", however it is understood that the gateway may instead manage topology for only a portion of a network, or a subnetwork containing only a subset of devices of the entire wireless network. Additionally, while the term "gateway" is used, it will be understood that such term can refer to any device that joins two networks (or subnetworks) so as to allow communication therebetween, even if the device performs other additional functions. The gateway is understood to refer to either hardware or software or any combination thereof.

As can be seen in FIG. 3, gateway 12 is located one hop from nodes N2 and N3. Node N1 is accessible only via communication through node N2 as an intermediary. Nodes N4 and N5 are accessible only through node N3 as an intermediary. As illustrated in FIG. 3, a "one-hop" path from gateway 12 is illustrated as solid line, while two-hop and three-hop paths are illustrated as dashed and dotted lines, respectively.

FIG. 3 illustrates that gateway 12 stores a topology map 12a and each of the nodes N1-N5 stores a "link status table" 24a. While FIG. 3 refers only a single "map" or "table," it will be understood that such may be implemented as one or more tables or databases, for example, and need not be stored as a single data structure. For example, the topology map 12a may be stored in a memory of gateway 12 and may include, for example, at least an overall topological map of the network 10 (or subnetwork) and/or a plurality of link status tables to store information received from network nodes (described in more detail below). Similarly, the link status table 24*a* may be stored in a memory 23 of nodes N1-N5.

Referring to FIG. 3, in the exemplary embodiment, assume that a multicast message has been sent over the network 10 by gateway 12, with a time-to-live value great enough such that every node in network 10, here nodes N1-N5, receives the multicast message. In the example shown in FIG. 3, that time-to-live value would be at least a value of 3, however, it is understood that this is a minimum value for a small number of exemplary nodes, and, in a larger network, gateway 12 may send a message with a longer period of expiration to ensure none of the network nodes are omitted.

The multicast message sent from gateway 12 to nodes N1-N5 defines a request for each of those nodes to transmit, via multicast, a "topological ping" to its neighboring nodes, that is, each node within one hop from the sender of the topological ping. This topological ping can be understood as a request to determine link status or link quality to the node that receives the topological ping. In an exemplary embodiment, the topological ping will be sent as a multicast message with a time-to-live value of 1 so that it is not retransmitted by the nodes that receive it. In other words, the topological ping is a one-hop multicast message. However, any other type of message that reaches the immediately neighboring nodes may be used.

While the nodes N1-N5 will likely not receive the multicast message from the gateway 12 at the same exact time, the difference in time of receipt may be relatively small or insignificant. As a result, each of the nodes may be available to process the request and send a topological ping at a relatively close, if not overlapping time. If all of the nodes attempt to transmit a topological ping to all of their neighbors at, or approximately at, the same time, their actions may overlap each other, leading to a data collision. To counter this, a transmission interval or timeslot can be assigned to each node transmitting the message.

In a preferred embodiment, each node transmitting the message may have a known transmission order value reflecting the node's scheduled "position" or "timeslot" to transmit. In the preferred embodiment, to avoid transmission by two nodes at the same time, the range of order values will generally correspond to the total number of nodes transmitting. Initially, a node 15 receives the multicast message sent by the gateway 12. This multicast message acts as a trigger for the protocol stack 27 of the node 15, instructing it to stop the normal communication of node 15 and instead schedule transmission of a topological ping. The stack 27, being aware of the node's order value, is able to determine its transmission timeslot therefrom. This may be done, for example, through an algorithmic calculation by the stack 27, by reference to a table storing transmission timeslots, by reference to information sent in the initial multicast message, or any other known or developed method. Stack 27 is therefore able, in response to receipt of the multicast message from gateway 12, to schedule transmission of the topological ping in its particular assigned timeslot. Because each node 15 is transmitting in an independent timeslot, no two nodes will overlap in their transmission and data loss during the transmission of the topological pings can be minimized or avoided.

In an alternative embodiment, rather than an assigned timeslot, a randomized transmission interval can be assigned to each node transmitting the message. The protocol stack 27 of a node 15 may calculate a randomized delay and then delay transmission of the topological ping by that calculated amount. The stack 27 may then schedule transmission of the message after that randomized delay expires. To help avoid data collisions, the calculated random delay interval should be at least as long as is necessary to allow the multicast message transmitted by the gateway 12 to propagate to all of the nodes N1-N5 (or all nodes in the network, as appropriate). Taking this randomized delay into consideration, nodes N1-N5 may then independently proceed to send a topological ping to each of their respective neighboring nodes. This randomized interval approach avoids the processing overhead of calculating a timeslot for transmission, but runs the risk of collision between topological pings where, by chance, a randomized calculation results in an identical delay.

In yet an alternative embodiment, instead of a randomized time interval, all of the nodes within a window may transmit according to a "listen before transmit" protocol, where stack 27 of a node 15 listens to the surrounding network traffic and waits to transmit if another nearby node is in the process of transmitting. In another embodiment, the stack 27 may use both a randomized time interval and a "listen before transmit" protocol, and the stack 27 may use other collision avoidance techniques as may be desired.

As described above, each of nodes N1-N5 is assumed to have received a multicast message from the gateway that triggers the node to send a multicast ping to all of its neighbors, and each of nodes N1-N5 neighbors at least one other of nodes N1-N5. In view of this, it will be understood that each of nodes N1-N5 will both send and receive at least one topological ping to or from its neighboring nodes. Because of this, each of the nodes N1-N5 may alternately act as a "transmitting node" that transmits a topological ping to a neighbor at the request of the gateway, and also as a "receiving node" that receives the topological ping and collects information about link status at the request of a neighboring transmitting node.

As a receiving node, any of nodes N1-N5 that receives a topological ping will collect link status in response thereto. This link status may include a variety of information, including at least information identifying the transmitting node and information about the link quality between such transmitting node and the receiving node. For example, a receiving node could determine the network identifier of the transmitting node from the source address of the topological ping (or any other piece of information that would uniquely identify the transmitting node, such as, for example, a MAC address) and an indicator of link quality such as a received signal strength indicator (RSSI) for the topological ping, a measurement of signal power in the received signal, or received channel power indicator (RCPI). While the preferred embodiment uses a measurement of RSSI, any other measurable indicator of link quality may be used in the alternative. It will be understood that RSSI is dependent on and reflective of the environmental conditions of the indoor or outdoor space in which the nodes are located. The receiving node N1-N5 then stores these pieces of information (for example, the network identifier of the transmitting node and the RSSI) in association with each other in the receiving node's memory in a link status table 24*a*.

FIGS. 4A-4C depicts exemplary embodiments of such link status tables. FIG. 4A shows an exemplary link status table 24*a* stored in the memory of node N2, after it has gathered information about link status in response to topological pings from all of its neighboring nodes. As depicted in FIG. 3, Node N2 is neighboring to nodes N1 and N3, therefore, both of nodes N1 and N3 would have sent a topological ping to node N2. Node 2 therefore determines and stores, for each of the topological pings sent, a separate table entry including a network identifier 40 of the transmitting node, a network identifier 42 of the receiving node (here, node N2), and a measurement of link quality 44. Note that it is unnecessary for the table to include the network identifier of the receiving node. In this regard, the receiving node is aware of its network identifier and may provide it when providing the link status information without storing it in the table. Alternatively, the receiving node may not provide its identifier 42 to the gateway at all, and the gateway may determine the identifier 42 of the receiving node based on the source address of the receiving node's transmission.

Similar to FIG. 4A, FIG. 4B depicts entries of a link status table of node N3, which is neighboring to nodes N2, N4, and N5, and FIG. 4C depicts entries of a link status table of node N4, which is neighboring to nodes N3 and N5. As a receiving node receives additional or subsequent topological pings from neighboring nodes, the receiving node will add additional line entries to the link status table 24a corresponding to those transmitting nodes. It will be understood, or course, that while FIGS. 4A-4C depict tables, any data structure may be used to store this type of information, so long as an association between the network identifier of the transmitting node and the RSSI (or comparable information) is maintained.

Once each of the receiving nodes has processed topological pings from all of its neighbors, and has compiled the relevant information in a link status table 24a, this information is preferably sent by the receiving nodes to the gateway 12 for consolidation and analysis. Accordingly, in an exemplary embodiment of the present invention, each of the receiving nodes N1-N5 will independently send the information in the link status table to gateway 12. The message containing the link status table 24a (or the information stored therein in another format) is, in the exemplary embodiment, a multicast message, however, the data within the message is not processed by any intermediate node. Instead, a link status table 24a is aggregated, with the other received link status tables 24a, by the gateway 12 itself. It will be understood that, based on the amount of data contained in the link status table 24a, nodes N1-N5 may need to send multiple multicast messages to convey all relevant information to gateway 12. If unicast messaging is used, the status tables may be sent by unicast messages rather than multicast. However, in some cases, it may be desirable to configure the network not to communicate unicast messages and only communicate multicast messages in order to avoid congestion resulting from messages communicated for route discovery.

In the preferred embodiment, transmission by the receiving nodes to the gateway 12 does not begin until all of the receiving nodes have received topological pings from all of their neighboring nodes and have completed processing of the same. As the required time for this receipt and processing may be unpredictable, depending on the configuration of the network (for example, because the size and complexity of the network may be unknown), the receiving nodes N1-N5 may implement a lengthy delay of a set, or predetermined, amount of time (e.g., a set number of seconds or minutes) that is at least long enough to ensure completion of the link status surveys by all of the receiving nodes prior to the commencement of a transfer of information to the gateway 12 by any one receiving node. In an alternative embodiment, rather than a set delay, the receiving nodes may wait for the receipt of a second multicast message sent from gateway 12 to all of the nodes. This multicast message can serve as a trigger indicating that that the receiving nodes may transmit the link status information to the gateway 12.

After waiting for this set amount of time (or for receipt of a trigger message), it is likely that each of the nodes N1-N5 will be available to transmit the link status information to the gateway 12 at a relatively close, if not overlapping, time. If all of the nodes attempt to send link status information to the gateway 12 at, or approximately at, the same time, their transmissions may overlap each other, leading to data collisions. To counter this, as described above with regard to the transmission of topological pings, the receiving nodes may refer to a known transmission order value (assigned to each receiving node) from which the protocol stack 27 of a receiving node may calculate an assigned timeslot to transmit the link status information, each timeslot being unique from that of the other receiving nodes. The stack 27 will then transmit its aggregated link status information to the gateway 12 during its scheduled time for transmission.

In an alternative embodiment, rather than a scheduled timeslot, the receiving nodes may delay transmission by an individually-determined randomized period of time. The protocol stack 27 of the receiving nodes N1-N5 may calculate this randomized delay and then delay transmission of the link status information by that calculated amount, beyond the predetermined delay. Additional delays may also be implemented as appropriate for efficiency of network management.

It will be understood that, instead of, or in addition to, a randomized time interval, all of the receiving nodes may transmit to the gateway according to a "listen before transmit" protocol, or may wait for a predetermined amount of time to elapse without the receipt of any transmission to network interface 25.

Taking this scheduled timeslot (and/or any delays) into consideration, nodes N1-N5 may then independently proceed to send their link status information to the gateway 12. It will be noted that in the exemplary embodiment, the transmission from the receiving nodes N1-N5 to the gateway 12 can be performed without prompting from the gateway 12 further to its initial request. In other words, in some embodiments, beyond its initial multicast message, the gateway 12 does not send any additional messages related to topological discovery prior to receiving the link status information from the receiving nodes.

Figure 5:
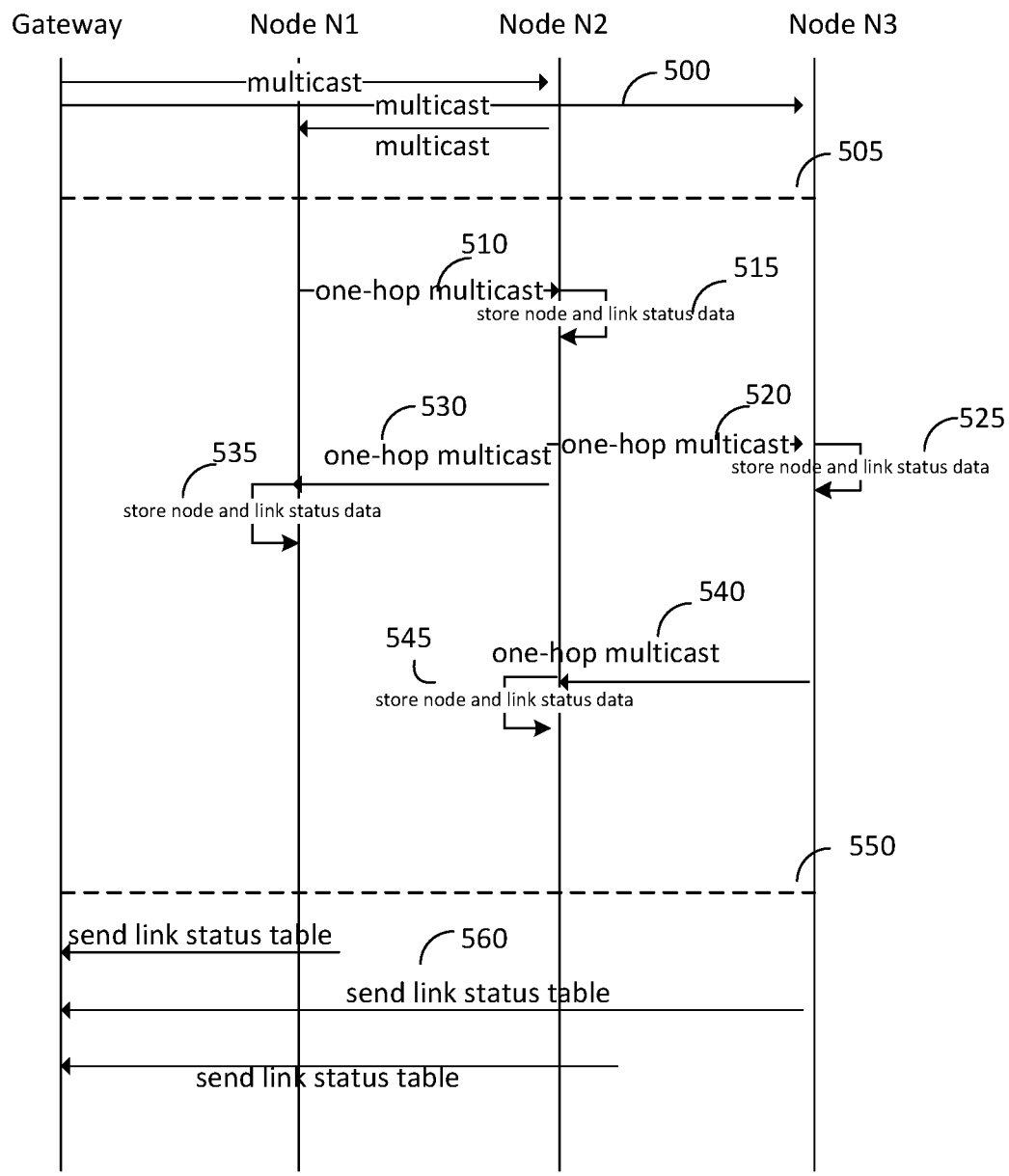
FIG. 5 is a diagram illustrating an exemplary transmission of data between network devices in accordance with the present disclosure.

FIG. 5 depicts a chart illustrating the flow of information between the networked devices. For the sake of simplicity, FIG. 5 refers only to the gateway 12 and nodes N1-N3 of FIG. 3 (omitting nodes N4 and N5), as if only nodes N1-N3 were in the subnetwork managed by gateway 12. However, as described above with regard to the exemplary embodiment shown in FIG. 3, transmission would in actuality occur to and from all nodes (including nodes N4 and N5), provided each node was properly configured so as to send and receive communications.

As depicted in FIG. 5, in step 500, gateway 12 sends a multicast message to the networked nodes, here N1, N2, and N3. In particular, the gateway 12 transmits the message to nodes N2 and N3, which are one hop from the gateway 12, and node N2 in turn retransmits the message to node N1. Accordingly, all of nodes N1-N3 have received the multicast message at the time of step 505. At steps 510-545, after implementing a randomized delay interval, each of nodes N1, N2, and N3 sends a one-hop multicast topological ping to its neighboring nodes. In particular, node N1 sends a ping to node N2 (step 510), node N2 sends a ping to nodes N1 and N3 (steps 530 and 520, respectively), and node N3 sends a ping to node N2 (step 540). In response to each of those pings, the respective receiving node stores at least one node identifier and link status data relating to the ping in its link status table 24*a* (steps 515, 525, 535, and 545). As can be seen, node N2 stores two sets of information, in response to two different pings (steps 525 and 535).

By the time of step 550, all of the receiving nodes have received topological pings and stored corresponding node and link status data. After implementing a predetermined delay period to allow for the completion of processing by the other receiving nodes, as well as a randomized delay interval, each of the receiving nodes sends its link status table to gateway 12 (step 560).

As a result of the method shown in FIGS. 3 and 5 and as described above, transmissions between nodes in connection with topological mapping are limited to the initial multicast transmission from a gateway, a one-hop multicast message from each node to its neighbors, and a one-time transmission from each node to the gateway at a later period. This allows for a significant reduction of overall network traffic in connection with topology discovery, thereby reducing the probability of data collisions occurring before or while the gateway attempts to build an accurate topological map. With less network traffic, the potential for data loss from transmissions stepping on or overlapping each other is reduced. This leads to a more accurate collection of information regarding links between nodes and link status, increasing the comprehensiveness and reliability of the aggregated topological map. Further, to the extent that data collisions occur, the multicast nature of the transmissions helps to increase the probability that each node and link will be discovered despite the occurrences of the data collisions. Still further, the present invention reduces the duration of the topological discovery process, which is often a painstaking process that ties up the network away from its normal operation. As a result, the systems and methods described herein provide a basis for more efficient management of the wireless network.

Results

Under a traditional method of topology discovery, the discovery process is performed serially through an independent inquiry of each individual network node. In particular, a network gateway provides an initial command to a network node (requesting node), which in turn sends a request to all devices within range (neighboring nodes). Each of the neighboring nodes assesses the status of its link with the requesting node, and sends that information back to the requesting node. The requesting node receives information from each of its neighboring nodes, then transmits that information to the gateway. The gateway then, in a serial process, contacts a second node of the network and repeats this process. The transmissions are often unicast messages, to ensure reliability of transmission.

In this conventional system, the bare minimum of messages that are needed to discover the topology of a network is:

$$\text{Total Messages} = 3 * N_{nodes} + N_{nodes}^2 \qquad \text{(Equation 1)}$$

However, in practice, due to the size and complexity of most modern networks (generally, at least 10 devices managed by a gateway), a more accurate estimate of messages needed to discover the topology of a network, using the conventional manner, would be:

$$\text{Total Messages} = 13 * N_{nodes} \qquad \text{(Equation 2)}$$

By comparison, in the present invention described above and depicted in FIGS. 1-5, transmissions between the nodes in connection with topology discovery are limited to the initial multicast transmission from a gateway, a one-hop multicast message from each node to its neighbors, and a one-time transmission from each node to the gateway at a later period. This effectively reduces the total number of messages to:

$$\text{Total Messages} = 2 * N_{nodes} + 1 \qquad \text{(Equation 3)}$$

Using equations 2 and 3 above, in a network with 1000 nodes, the conventional topology method would require the transmission of about 13,000 messages, while the present invention would require only about 2001 messages to discover the network topology. Assuming, for the sake of example, that the process involves a transmit latency of 5 ms, and a randomization of 2 seconds, the conventional topology method would take a total of about 2015 seconds, while the present invention would require only about 32 seconds until completion.

This disclosure may be provided in other specific forms and embodiments without departing from the essential characteristics as described herein. The embodiments described are to be considered in all aspects as illustrative only and not restrictive in any manner.

Now, therefore, the following is claimed:

1. A wireless network comprising:
   a network management device; and
   a plurality of nodes configured to send and receive multicast messages over the wireless network,
   wherein the network management device is configured to send a first multicast message over the wireless network to each of the plurality of nodes, and
   wherein a first node of the plurality of nodes is configured to:
   (a) receive the first multicast message sent by the network management device,
   (b) send, in response to the first multicast message, a second multicast message to one or more nodes, of the plurality of nodes, that are within a communication range of the first node,
   (c) receive a third multicast message from a second node of the plurality of nodes,
   (d) store, in a memory, link status information, wherein the link status information comprises, in association with each other, (i) a network identifier of the first node, (ii) a network identifier of the second node, and (iii) a value indicating a link quality between the first node and the second node, and
   (e) transmit, to the network management device, one or more multicast messages comprising the link status information.

2. The wireless network of claim 1, wherein the value indicating a link quality is determined based on a received signal strength indicator of a transmission between the first node and the second node.

3. The wireless network of claim 1, wherein when the multicast message is received by the first node, the first node will suppress transmission of the second multicast message for a randomly generated period of time.

4. The wireless network of claim 1, wherein after the first node stores the link status information in the memory, the first node will suppress transmission to the network management device of the link status information for a randomly generated period of time.

5. The wireless network of claim 1, wherein the network management device is further configured to receive link status information from a plurality of nodes, to aggregate the received link status information, and to generate a topological map of the wireless network based on the aggregated link status information.

6. The wireless network of claim 1, wherein the network management device is a gateway.

7. The wireless network of claim 1, wherein the sending of the second multicast message is done in accordance with a determination, by the first node, of a scheduled timeslot for transmission.

8. The wireless network of claim 1, wherein the transmission of the one or more multicast messages to the network management device is done in accordance with a determination, by the first node, of a scheduled timeslot for transmission.

9. A method of collecting topological information of a wireless network, the method comprising:
   receiving, by a first node of the wireless network, a multicast message from a network management device;
   receiving, by the first node, from a second node of the wireless network, a second multicast message containing instructions to generate topological information;
   calculating, by the first node, based on the second multicast message, a first signal strength between the first node and the second node;
   receiving, by the first node, from a third node of the wireless network, a third multicast message containing instructions to generate topological information;
   calculating, by the first node, based on the third multicast message, a second signal strength between the first node and the third node;
   generating a link status table, wherein the link status table stores information related to the calculated first signal strength and the calculated second signal strength;
   scheduling, by the first node, a transmission of a fourth multicast message to the network management device, the transmission containing information contained in the link status table; and
   transmitting the fourth multicast message to the network management device in accordance with the scheduled transmission.

10. The method of claim 9, wherein the scheduling is done in accordance with a randomized time interval.

11. The method of claim 9, wherein the scheduling is done in accordance with a determination, by the first node, that a predetermined amount of time has passed since the first node has received a transmission from another device on the wireless network.

12. The method of claim 9, wherein the scheduling is done in accordance with a determination, by the first node, of a unique timeslot for transmission.

13. A method for discovering a topology for a plurality of nodes of a network, the method comprising:
   (a) transmitting, from a network management device, a multicast message through the network to each of the plurality of nodes;
   (b) transmitting, from the plurality of nodes, multicast pings in response to the multicast message;
   (c) in response to each of the multicast pings, performing the following:
      (1) determining, based on the respective multicast ping between one of the plurality of nodes that transmits the respective multicast ping and each of the plurality of nodes that receives the respective multicast ping, link status information indicating a link quality for each link between the one of the plurality of nodes that transmits the respective multicast ping and each of the plurality of nodes that receives the respective multicast ping; and
      (2) storing the link status information in at least one of the plurality of nodes that transmits or receives the respective multicast ping,
   (d) after a delay sufficient for ensuring that each of (1) and (2) have been performed for each of the multicast pings, transmitting the link status information through the network to the network management device; and
   (e) building, by the network management device, the topology of the network based on the link status information.

* * * * *